UNITED STATES PATENT OFFICE.

NATHAN SULZBERGER, OF NEW YORK, N. Y.

OLEIC-ACID DERIVATIVE OF BODIES OF THE TERPENE GROUP.

969,420.  Specification of Letters Patent.  Patented Sept. 6, 1910.

No Drawing.   Application filed May 6, 1909. Serial No. 494,413.

*To all whom it may concern:*

Be it known that I, NATHAN SULZBERGER, a citizen of the United States, residing at No. 34 West Seventy-first street, New York city, in the county of New York and State of New York, have invented new and useful Products to be Used for Pharmaceutical and Medical Purposes, Oleic-Acid Derivatives of Bodies of the Terpene Group, of which the following is a specification.

I have found that the oleates of menthol and other bodies of pharmaceutical value belonging to the terpene group, and their derivatives, while still retaining the soothing and other medical properties of the free uncombined products out of which they were formed, do not possess the irritating action of the same, and are furthermore characterized by penetrating more rapidly and deeply into the skin—a fact which markedly improves and increases the value of these oleates, especially when used externally, either by themselves, or in the form of salves and ointments, mixed with animal, vegetable and mineral fats and oils. The oleates can be prepared by treating the solution of these terpene derivatives, and oleic acid, with dehydrating agents, as for instance, phosphorus-oxy-chlorid, phosphorus-tri-chlorid, etc., or by bringing the oleic acid chlorid into reaction with these terpene bodies. These new products are almost entirely odorless, and represent oils of a more or less yellowish coloration, insoluble in water and split by the action of caustic soda into the terpene-body, from which they were formed, and sodium oleate.

In order to illustrate my invention more clearly, I shall herewith describe my preferred method of preparing the menthol-ester of oleic acid:

200 grams of oleic acid (dried) were treated with 42 grams of phosphorus-trichlorid, and the mixture, after standing for several hours, at ordinary temperature, gradually heated up on the water-bath, to about 80 degrees C. The oleic acid chlorid, freed from the excess of phosphorus tri chlorid, and from the formed phosphorous acid, was brought into reaction with one. molecular proportion (figured on the oleic acid chlorid) of menthol (dry). After the evolution of hydrochloric acid had ceased at about 30-40 degrees C., the temperature was gradually raised to about 80-90 degrees C., and kept there for several hours. The reaction of the menthol with the oleic-acid chlorid takes place according to the following equation:

The finished ester, after being carefully washed with water from all by-product, and dried by keeping same for an hour at 110 degrees C., is ready for use. The same forms an oily liquid of yellowish color, free from the odor of menthol, insoluble in water, decoloring bromin and split by the action of caustic soda into sodium-oleate and menthol. Rubbed on the skin (fore-head), the cooling and soothing action of the free menthol is evinced.

In a similar manner the oleic acid derivative of borneol can be obtained, namely, by heating a mixture of borneol with an excess of over one molecule of oleic acid chlorid for several hours on a water bath, after such mixture has been standing for some time at ordinary temperature. This borneol preparation, when free from the excess of oleic acid chlorid and from the formed phosphorous acid and washed neutral, is ready for use. In similar manner other alcohols belonging to the terpene group may be heated together with oleic acid, as, for instance, terpineol, iso-borneol, etc.

The above cited examples should only indicate the method of manufacturing and preparing some of the compounds according to my invention.

I wish it to be understood that the temperatures and quantities, also the method of purification may be variously changed from the above described.

I claim:

1. The menthyl-ester of oleic acid of the nature disclosed, characterized by being a yellowish oil at ordinary temperature, unsoluble in water, derived from oleic acid and menthol, de-composed by the action of caustic alkali and decolorizing bromin water.

2. Esters of oleic acid with bodies containing an alcoholic hydroxyl belonging to the terpene group of the nature herein disclosed and characterized by being oils of yellowish color at ordinary temperature, unsoluble in water, decomposed by the action of caustic alkali, decolorizing bromin water and derived by chemically combining oleic acid with the alcoholic hydroxyl of a body belonging to the terpene group.

3. Compounds derived by heating oleic-acid chlorid and alcohols belonging to the terpene group, characterized by being oils of a yellowish color, insoluble in water and alcohol, de-coloring bromin, and producing sodium-oleate when treated with caustic soda.

NATHAN SULZBERGER.

Witnesses:
BENJAMIN SROTER,
JOHN S. COLWELL.